(12) United States Patent
Choe et al.

(10) Patent No.: US 11,320,070 B2
(45) Date of Patent: May 3, 2022

(54) TUBE INFRASTRUCTURE WITH VACUUM PRESSURE

(71) Applicant: KOREA RAILROAD RESEARCH INSTITUTE, Uiwang-si (KR)

(72) Inventors: Jae Heon Choe, Anyang-si (KR); Kwan Sup Lee, Gunpo-si (KR); Su Yong Choi, Changwon-si (KR); Chang Young Lee, Bucheon-si (KR); Jung Youl Lim, Seoul (KR); Jin Ho Lee, Seoul (KR); Yong Jun Jang, Anyang-si (KR); Jeong Min Jo, Suwon-si (KR); Min Hwan Ok, Uiwang-si (KR); Jae Hoon Kim, Goyang-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 166 days.

(21) Appl. No.: 16/607,943

(22) PCT Filed: Jul. 19, 2018

(86) PCT No.: PCT/KR2018/008160
§ 371 (c)(1),
(2) Date: Oct. 24, 2019

(87) PCT Pub. No.: WO2019/031725
PCT Pub. Date: Feb. 14, 2019

(65) Prior Publication Data
US 2020/0362995 A1    Nov. 19, 2020

(30) Foreign Application Priority Data

Aug. 10, 2017 (KR) .......................... 10-2017-0101788

(51) Int. Cl.
*B61B 13/10* (2006.01)
*F16L 17/02* (2006.01)
*G01M 3/32* (2006.01)

(52) U.S. Cl.
CPC .............. *F16L 17/02* (2013.01); *B61B 13/10* (2013.01); *G01M 3/3236* (2013.01)

(58) Field of Classification Search
CPC ......... F16L 17/02; F16L 17/10; F16L 23/167; F16L 17/00; F16L 2201/30; F16L 21/02;
(Continued)

(56) References Cited

U.S. PATENT DOCUMENTS

| 4,041,718 A | 8/1977 | Stone |
| 4,181,995 A * | 1/1980 | Zur ...................... E01D 15/133 104/126 |

(Continued)

FOREIGN PATENT DOCUMENTS

| FR | 2327171 | 5/1977 |
| GB | 2065228 | 6/1981 |

(Continued)

OTHER PUBLICATIONS

International Search Report—PCT/KR2018/008160 dated Nov. 29, 2018.

(Continued)

*Primary Examiner* — Mark T Le
(74) *Attorney, Agent, or Firm* — Cantor Colburn LLP

(57) ABSTRACT

A tube infrastructure includes a first tube; a second tube that is coupled to the first tube; and a fluid tank that is disposed to surround a coupling region of the first tube and the second tube and is filled with a fluid to seal the coupling region, wherein the fluid tank allows negative pressure to be maintained inside the first tube and the second tube.

10 Claims, 5 Drawing Sheets

(58) Field of Classification Search
CPC ........ F16L 21/03; F16L 21/035; B61B 13/10; G01M 3/3236; G01M 3/02; F16J 15/00; F16J 15/004
USPC .................................................. 285/230, 234
See application file for complete search history.

(56) References Cited

U.S. PATENT DOCUMENTS

| | | | | |
|---|---|---|---|---|
| 5,170,659 | A | * | 12/1992 | Kemp .................... F16L 23/167 137/312 |
| 5,461,904 | A | * | 10/1995 | Baker ................. G01M 3/2853 277/320 |
| 5,918,914 | A | * | 7/1999 | Morris .................... F16L 17/02 285/351 |
| 8,132,780 | B2 | * | 3/2012 | Tibbitts ..................... F16L 1/26 251/149.7 |
| 2013/0327412 | A1 | * | 12/2013 | DeGeorge ............. G01M 3/022 137/15.01 |
| 2014/0261054 | A1 | | 9/2014 | Oster |
| 2016/0230350 | A1 | | 8/2016 | Bambrogan et al. |

FOREIGN PATENT DOCUMENTS

| | | |
|---|---|---|
| JP | 2000240810 | 9/2000 |
| JP | 2005016722 | 1/2005 |
| JP | 2005042328 | 2/2005 |
| JP | 2016191638 | 11/2016 |
| KR | 101130807 | 3/2012 |
| WO | 2016126495 | 8/2016 |

OTHER PUBLICATIONS

European Search Report—European Application No. 18844367.5 dated Apr. 21, 2021, citing JP 2005-016722, US 2014/0261054, GB 2 065 228, FR 2 327 171, and WO 2016/126495.

* cited by examiner

TUBE INFRASTRUCTURE WITH VACUUM PRESSURE

CROSS-REFERENCE TO RELATED APPLICATIONS

This application is a national entry of PCT Application No. PCT/KR2018/008160 filed on Jul. 19, 2018, which claims priority to and the benefit of Korean Application No. 10-2017-0101788 filed on Aug. 10, 2017, in the Korean Patent Office, the entire contents of which are incorporated herein by reference.

BACKGROUND OF THE INVENTION

1. Field of the Invention

The present invention relates to a subsonic capsule train known as Hyper Tube Express (HTX) or Hyperloop, and particularly, to a tube infrastructure under negative pressure.

2. Description of the Related Art

Recently, there has been an active research on an ultrahigh speed vacuum train that can greatly improve a speed by making the inside of a tube close to vacuum to minimize air resistance. Particularly, in order to make the ultrahigh speed vacuum train, a large and long vacuum tunnel (tube) has to be made. Due to this, the tube has very large diameter and length and needs to be constructed by dividing sections of the tube. Further, the tube has to be equipped with a shutoff valve at regular lengths, resulting in a large number of connection portions. At this time, air outside the tunnel is prevented from being introduced into the tunnel through the connection portion to maintain a sub-vacuum state inside the tunnel. Therefore, it is very important to maintain the tube itself in a sealed state.

A typical method of connecting tubes includes a method of welding tubes formed of metal such as carbon steel, stainless steel, or aluminum, a method of applying an expansion joint of a grooved type, a metal bellows type or the like, a method of sealing a tube by using an elastomeric gasket between tubes made of a polymer material such as fiber reinforced plastics (FRP) or polyethylene (PE), and a method of filling a gap between tubes with adhesive such as epoxy or silicone.

However, in a case of a sealing structure using welding and bonding, it is difficult to buffer the tube when a thermal deformation of the tube occurs due to a temperature difference between seasons or the day and night. That is, there is a problem in which a thermal shock is applied to a connection portion, a damage of the connection portion occurs, and a construction cost is high. The sealing structure using a gasket has a problem in which a compression deformation occurs due to characteristics of an elastomer when a fastening pressure is applied for a long time, and thereby, a thickness and a sealing performance are reduced.

Further, the tube infrastructure has many connection portions due to limitation of a commercial tube length, which causes expensive maintenance and requires an additional system for detecting sealing. That is, the typical sealing structure has a lifespan limit, and thus, periodic maintenance and replacement are required, which is not suitable for a vacuum tube infrastructure targeting a long life.

In this regard, Korean Patent No. 10-1130807 (title of Invention: Vacuum sectional management system and vacuum blocking screen device for the tube railway) discloses a tube railway system that uses a sealed vacuum tube as a railroad track to enable a train to run at a high speed by minimizing noise and air resistance.

SUMMARY OF THE INVENTION

Some embodiments of the present invention relate to a coupling structure connecting two separate tubes, and an object of the present invention is to include a container which contains a fluid and is formed to surround a coupling region of the tubes, to prevent leakage by allowing the fluid with a high viscosity to act as a gasket, and to maintain the sealed state in the tubes.

Another object of the present invention is to detect leakage in real time by measuring a change in volume of a fluid in a container.

In order to achieve the above objects, a tube infrastructure according to an embodiment of the present invention includes a first tube; a second tube that is coupled to the first tube; and a fluid tank that is disposed to surround a coupling region of the first tube and the second tube and is filled with a fluid to seal the coupling region, wherein the fluid tank allows negative pressure to be maintained inside the first tube and the second tube.

Advantageous Effects

A tube infrastructure according to the present invention can simplify construction and maintenance methods, resulting in an innovative cost reduction and minimum influence of the infrastructure on a change in environment such as a thermal deformation of the tube infrastructure.

Further, it is possible to secure a time margin necessary for coping with leakage occurring due to characteristics of a structure using a fluid, and to detect the leakage in real time.

DETAILED DESCRIPTION OF THE EMBODIMENT

Figure 1:
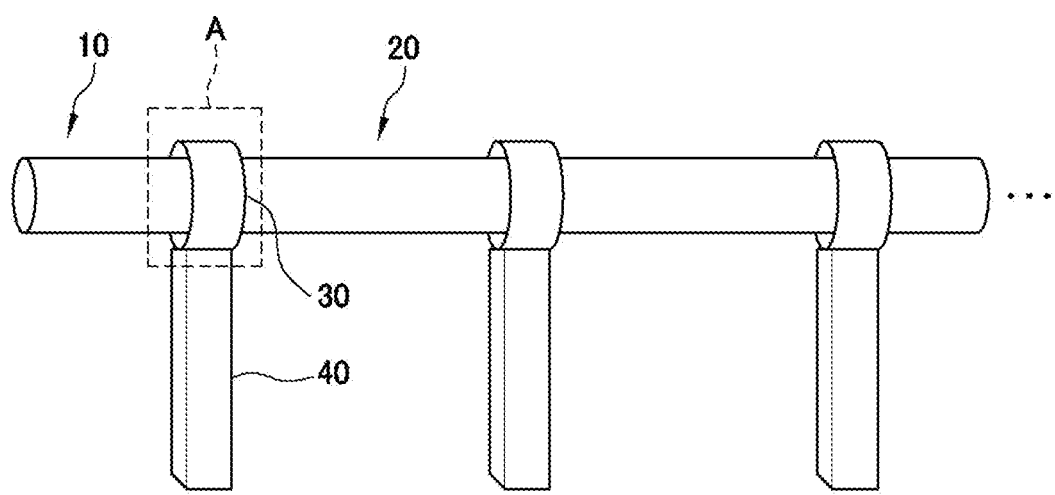
FIG. 1 is a view illustrating a railway bridge including a tube infrastructure according to an embodiment of the present invention.

Hereinafter, embodiments of the present invention will be described in detail with reference to the accompanying drawings such that those skilled in the art can easily implement the present invention. The invention can be embodied in many different forms and is not limited to the embodiments described herein. In addition, portions not related to the description are omitted in the drawings so as to describe the present invention more clearly, and like reference numerals are attached to like portions throughout the specification.

Throughout the specification, when a portion is described to be "connected" to another portion, this includes not only "directly connected" but also "electrically connected" with other elements therebetween. Further, when a portion is described to "include" a certain configuration element, this means that the portion can further include other configuration elements, except to exclude other configuration elements unless described otherwise in particular.

Figure 2:
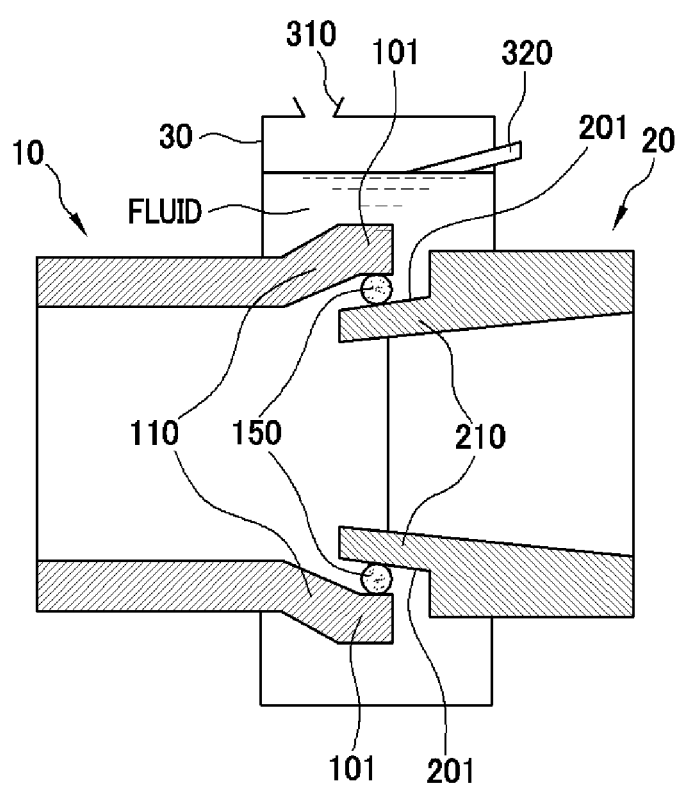
FIG. 2 is an enlarged view of A of FIG. 1 and is a vertical cross-sectional diagram of the tube infrastructure according to the embodiment of the present invention.
Figure 3:
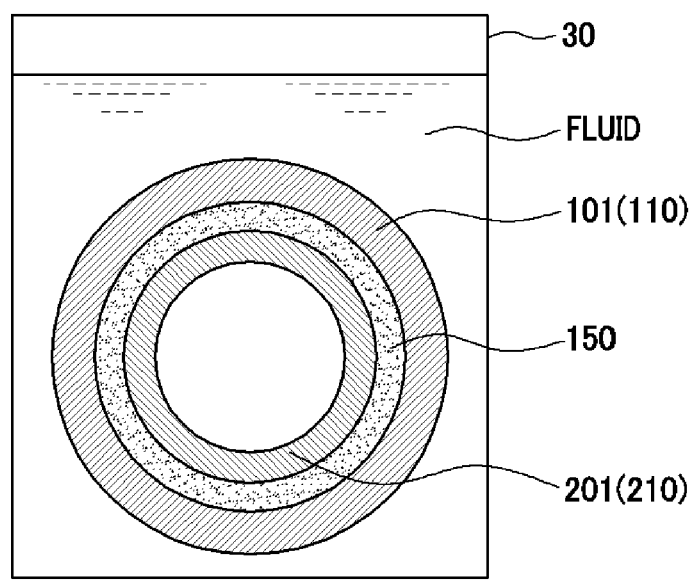
FIG. 3 is an enlarged view of A of FIG. 1 and is a horizontal cross-sectional diagram of a tube infrastructure according to the embodiment of the present invention.
Figure 4:
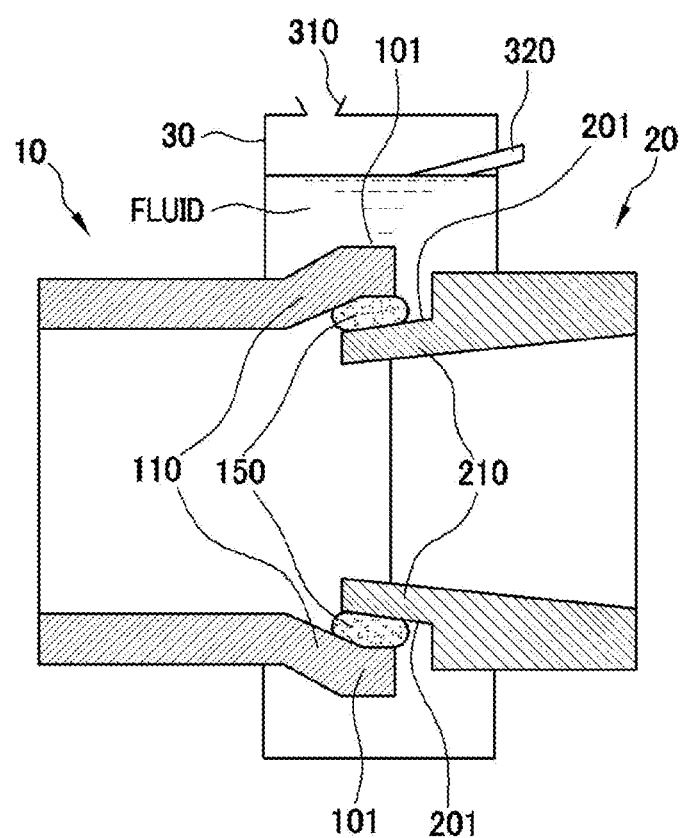
FIG. 4 is a vertical cross-sectional view illustrating a packing portion interposed in a coupling region of a tube according to the embodiment of the present invention.
Figure 5:
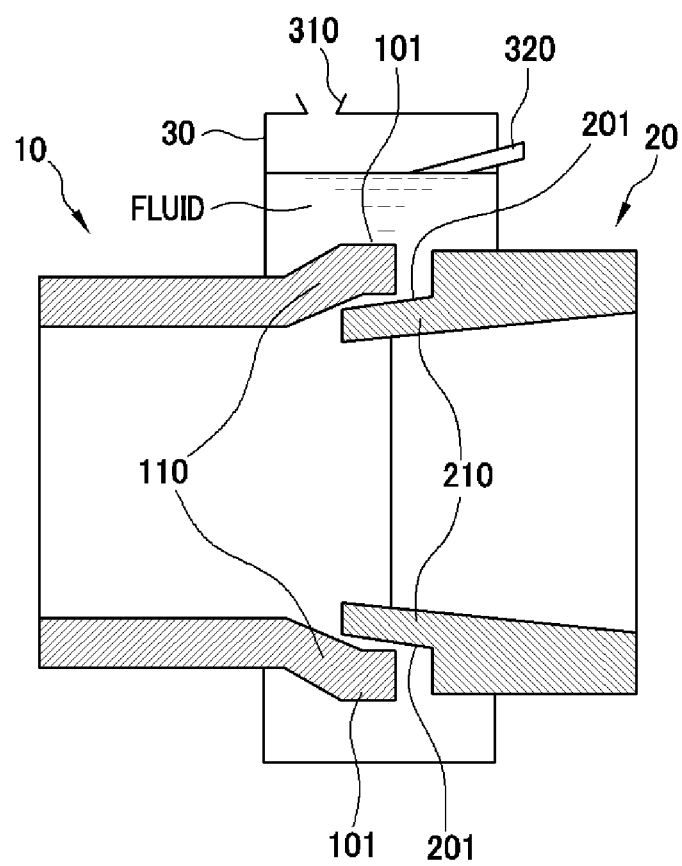
FIG. 5 is a vertical cross-sectional view of a tube infrastructure without the packing portion according to another embodiment of the present invention.

FIG. 1 is a view illustrating a railway bridge including a tube infrastructure according to an embodiment of the present invention, FIG. 2 is an enlarged view of A of FIG. 1 and is a vertical cross-sectional diagram of the tube infrastructure according to the embodiment of the present invention, FIG. 3 is an enlarged view of A of FIG. 1 and is a horizontal cross-sectional diagram of a tube infrastructure according to the embodiment of the present invention, FIG. 4 is a vertical cross-sectional view illustrating a packing portion interposed in a coupling region of a tube according to the embodiment of the present invention, and FIG. 5 is a vertical cross-sectional view of a tube infrastructure without the packing portion according to another embodiment of the present invention.

Referring to FIG. 1, a railway bridge includes a plurality of infrastructures. One tube infrastructure includes a first tube 10, a second tube 20, and a fluid tank 30 surrounding a coupling region of the first tube 10 and the second tube 20. Further, the railway bridge includes a plurality of tube infrastructures arranged horizontally in a horizontal direction and a plurality of piers 40 supporting the tube infrastructure. At this time, the pier 40 is disposed at a lower end of the fluid tank 30.

Specifically, referring to FIGS. 2 and 3, the tube infrastructure includes the first tube 10, the second tube 20 coupled to the first tube 10, and the fluid tank 30 which is disposed to surround the coupling region of the first tube 10 and the second tube and in which a fluid is filled therein to seal the coupling region. The fluid tank 30 allows negative pressure to be maintained inside the first tube 10 and the second tube 20.

That is, it is possible to completely block a gas inflow through the fluid tank 30 containing a fluid with a high viscosity surrounding the outside of the coupling region of the first tube 10 and the second tube 20. Due to this, a pressure difference between the inside and outside of the tube is maintained at approximately 1 atmosphere or more, and thereby, a negative pressure acts in the tube infrastructure. Further, even if a problem occurs in a sealed structure due to a high viscosity of the fluid, the fluid contained in the fluid tank 30 is first introduced into the first tube 10 and the second tube 20, and thus, there is an effect that vacuum inside the tube infrastructure can be further maintained for a predetermined period of time.

First, the fluid tank 30 can be disposed to surround the coupling region of the first tube 10 and the second tube 20 and can be filled with a fluid to seal the coupling region. For example, the insides of the first tube 10 and the second tube 20 are at a low pressure (approximately 0.001 atm) close to vacuum and the outside is at atmospheric pressure (1 atm). Further, the fluid tank 30 has an opening 310 through which the fluid is introduced at a region of an upper portion thereof. For example, rainwater can be introduced through the opening 310 to be used instead of the fluid with a high viscosity.

Here, the fluid can include at least one of fine particles (powder) and a short fiber to adjust the viscosity. Further, the fluid can include at least one of a volatile fluid and a nonvolatile fluid. For example, when a mixture of the volatile fluid and the nonvolatile fluid is used, the nonvolatile fluid can be located above the volatile fluid, thereby, preventing evaporation of the volatile fluid. The nonvolatile fluid can be used to lengthen a maintenance interval.

The first tube 10 and the second tube 20 are circular tubes having a diameter enough to allow an ultrahigh speed vacuum train to pass. A diameter of the tube can be formed to approximately 2 to 3 m based on the existing railway tunnel technology, but the present invention is not limited thereto, and individual tubes can be formed to have various lengths and thicknesses.

For example, the first and second tubes 10 and 20 can be formed of a metal material such as carbon steel, stainless steel or aluminum, a mixed material using steel and concrete together, a concrete material including a steel rib, a polymer material such as fiber reinforced plastics (FRP) or polyethylene (PE), and the like.

Referring to FIGS. 2 and 3, the tube infrastructure according to the present invention includes a female connection portion 110 and a male connection portion 210 which are located at both ends of the first tube 10 and the second tube 20, respectively. The female connection portion 110 of the first tube 10 and the male connection portion 210 of the second tube 20 can be coupled to each other by a fitting method.

Further, the tube infrastructure further includes a packing portion 150 interposed in the coupling region of the first tube 10 and the second tube 20. The packing portion 150 can be formed of at least one of an O-ring and a surface gasket formed of an elastomer, but the present invention is not limited thereto.

For example, referring to FIG. 4, the packing portion 150 can be disposed between an inner circumferential surface of the female connection portion 110 of the first tube 10 and an outer circumferential surface of the male connection portion 210 of the second tube 20 to seal insides of the first tube 10 and the second tube 20. Further, a diameter of the inner circumferential surface of the female connection portion 110 is formed to be larger than a diameter of the outer circumferential surface of the male connection portion 210. The male connection portion 210 of the second tube 20 can be fitted to the female connection portion 110 of the first tube 10. In addition, a coupling margin can be formed between the first tube 10 and the second tube 20 to buffer a change in length due to a thermal deformation.

Due to this, the packing portion 150 can block inflow of gas, and the fluid with a high viscosity contained in the fluid tank 30 can completely block the inflow of gas. Further, even if a minute gap occurs between the first and second tubes 10 and 20 and the packing portion 150, when the fluid contained in the fluid tank 30 has a high viscosity, the fluid does not flow into the gap. Due to this, the packing portion 150 and the fluid tank 30 can act as a double hermetic structure. In addition, even if a problem occurs in the coupling region of the first tube 10 and the second tube 20, the fluid contained in the fluid tank 30 can first flow into the inside of the first and second tubes 10 and 20. This allows vacuum inside the tube infrastructure to be maintained for predetermined period of time.

The tube infrastructure according to the present invention further includes a sensor 320 that detects whether or not a fluid of the fluid tank 30 leaks.

The sensor 320 can be provided inside the fluid tank 30 to determine that the fluid leaks when a volume of the fluid is measured to be equal to or less than an initial measurement value. That is, the sensor 320 initially measures the volume of the fluid contained in the fluid tank 30. Further, the sensor 320 can measure the volume of the fluid in real time.

Thereafter, the sensor 320 or an external computing device that receives a sensed value from the sensor 320 can determine that the fluid is leaked when the volume of the fluid is measured to be equal to or less than an initial measurement value. As such, only by measuring the volume of the fluid using the sensor 320, there is an advantage that leakage can be detected in real time without a need for a separate system for detecting sealing.

Referring to FIG. 5, the female connection portion 110 is formed such that a diameter of an inner circumferential surface increases toward the other end and includes a flange portion 101 formed on the other end surface. The male connection portion 210 is formed such that a diameter of an inner circumferential surface decreases toward one end and includes a groove portion 201 formed on the outer circumferential surface. Here, the groove portion 201 of the second tube 20 can be fitted to the flange portion 101 of the first tube 10. Due to this, the insides of the first tube 10 and the second tube 20 can be sealed.

Further, the groove portion 201 coupled to the flange portion 101 can be formed to have a coupling margin so as to enable the first tube 10 or the second tube 20 to move horizontally due to a thermal deformation.

For example, as illustrated in FIG. 5, when viewed from a vertical cross section, the female connecting portion 110 of the first tube 10 is extended to be inclined outwardly toward the other end and can have the flange portion 101 protruding from the other end. The male connection portion 210 of the second tube 20 includes a groove portion 201 extending so as to be inclined inwardly toward one end. The groove portion 201 can be formed to correspond to an inner circumferential surface of the flange portion 101 of the first tube 10. Further, a coupling margin formed between the flange portion 101 and the groove portion 201 can buffer a change in length of the first tube 10 or the second tube 20 due to a thermal deformation.

The description of the present invention described above is for an illustrative purpose, and those skilled in the art to which the present invention belongs will be able to understand that the present invention can be changed to other specific forms without changing the technical idea or essential features of the present invention. Therefore, it should be understood that the embodiments described above are exemplary in all respects and not restrictive. For example, each configuration element described as a single type can be implemented in a distributed manner, and similarly, configuration elements described in a distributed manner can be implemented in a combined form.

It should be construed that the scope of the present invention is represented by the following claims rather than the detailed description, and all changes or modifications derived from the meaning and scope of the claims and their equivalents are included within the scope of the present invention.

What is claimed is:

1. A tube infrastructure comprising:
    a first tube;
    a second tube that is coupled to the first tube;
    a fluid tank that is disposed to surround a coupling region of the first tube and the second tube and is filled with a fluid to seal the coupling region; and
    a sensor that detects whether or not the fluid of the fluid tank leaks,
    wherein the fluid tank allows negative pressure to be maintained inside the first tube and the second tube, and
    wherein the sensor is provided in the fluid tank to determine that the fluid leaks when a volume of the fluid is measured to be less than an initial measurement value.

2. The tube infrastructure according to claim 1, wherein the first tube and the second tube include a female connection portion and a male connection portion respectively located at both ends, and
    wherein the female connection portion of the first tube and the male connection portion of the second tube are coupled to each other by a fitting method.

3. The tube infrastructure according to claim 2, wherein the female connection portion is formed such that a diameter of an inner circumferential surface increases toward one end and includes a flange portion formed on one end surface,
    wherein the male connection portion is formed such that a diameter of an inner circumferential surface decreases toward one end and includes a groove portion formed in an outer circumferential surface, and
    wherein the groove portion of the second tube is fitted to the flange portion of the first tube.

4. The tube infrastructure according to claim 3, wherein the groove portion coupled to the flange portion is formed to have a coupling margin so as to enable the first tube or the second tube to move horizontally due to a thermal deformation.

5. The tube infrastructure according to claim 1, further comprising:
    a packing portion that is interposed in the coupling region of the first tube and the second tube.

6. The tube infrastructure according to claim 5, wherein the packing portion is configured by at least one of an O-ring and a surface gasket.

7. The tube infrastructure according to claim 1, wherein the fluid tank has an opening through which the fluid is introduced at a region of an upper portion.

8. The tube infrastructure according to claim 1, wherein the fluid includes at least one of fine particles and a short fiber.

9. The tube infrastructure according to claim 1, wherein the fluid includes at least one of a volatile fluid and a nonvolatile fluid.

10. A railway bridge including a tube infrastructure, the railway bridge comprising:
    a plurality of tube infrastructures arranged horizontally in a horizontal direction, wherein each of the tube infrastructures is the tube infrastructure according to claim 1; and
    a pier arranged at a lower end of the fluid tank of the tube infrastructure to support the tube infrastructure.

* * * * *